Figure 1:
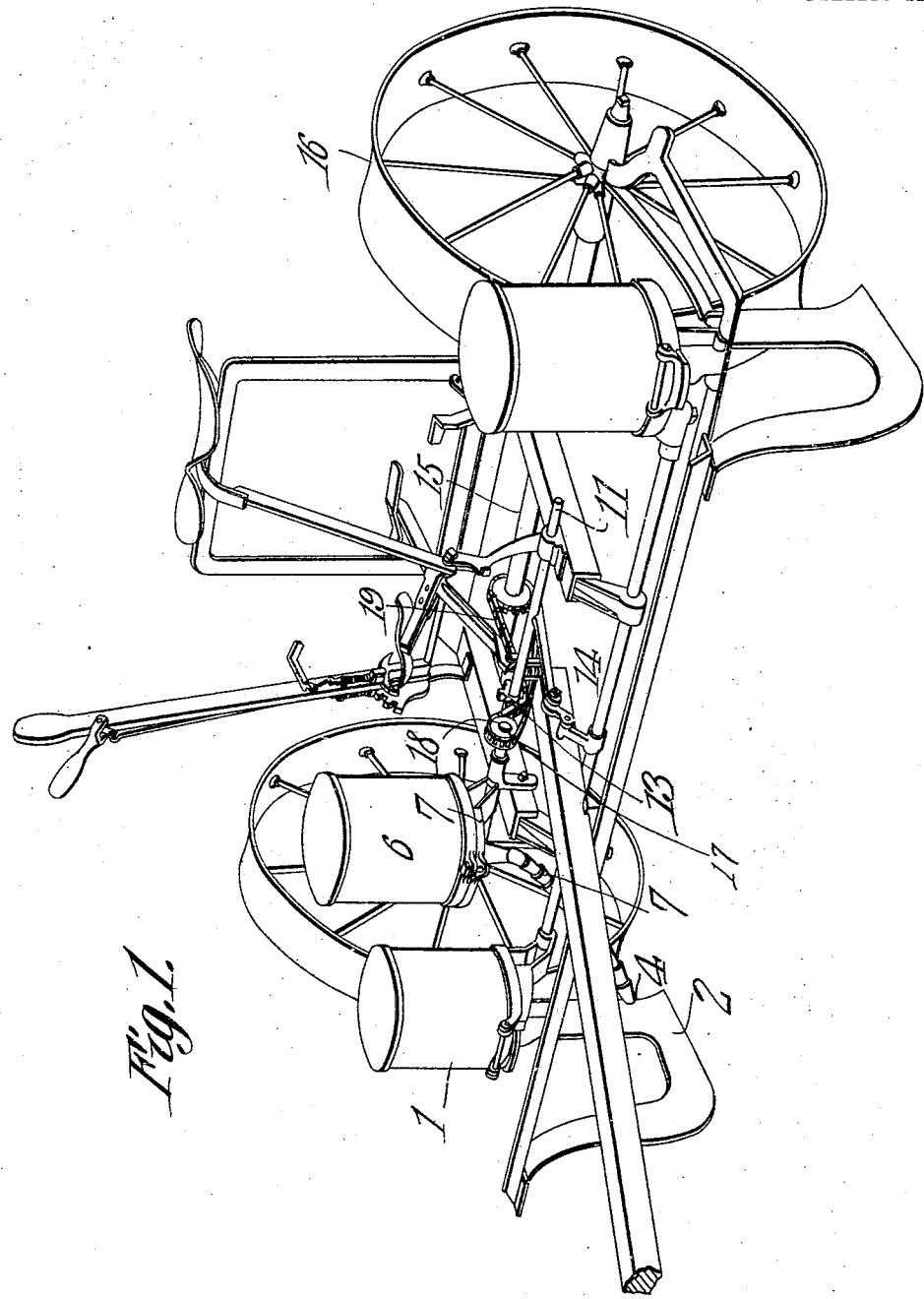

F. A. COOK.
ATTACHMENT TO CORN PLANTERS.
APPLICATION FILED JULY 26, 1909.

939,983.

Patented Nov. 16, 1909.
2 SHEETS—SHEET 1.

F. A. COOK.
ATTACHMENT TO CORN PLANTERS.
APPLICATION FILED JULY 26, 1909.
939,983.
Patented Nov. 16, 1909.
2 SHEETS—SHEET 2.
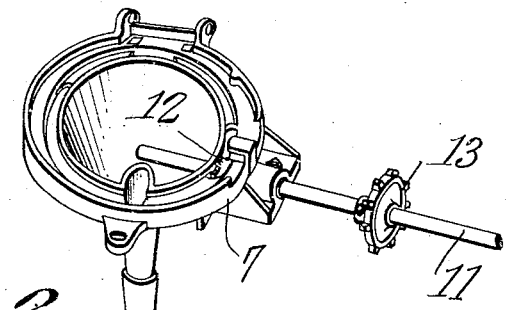
Fig. 2.
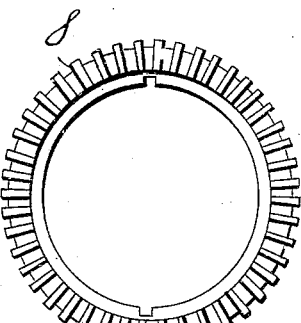
Fig. 5.
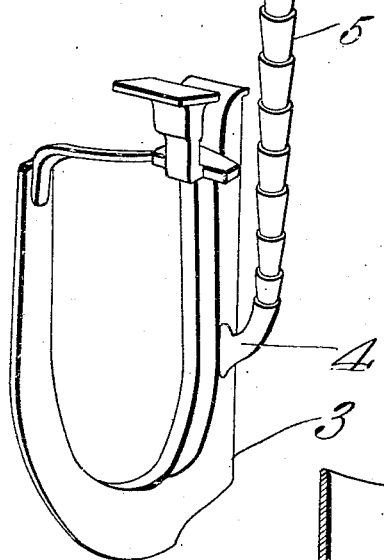
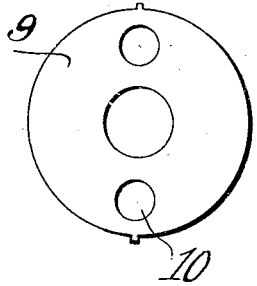
Fig. 6. Fig. 7.
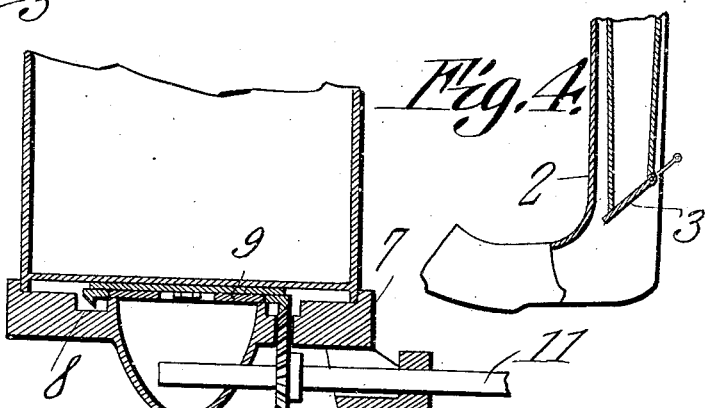
Fig. 4.
Fig. 3.
Witnesses
Inventor
Fayette A. Cook.
Attorneys

UNITED STATES PATENT OFFICE.

FAYETTE A. COOK, OF ELKADER, IOWA.

ATTACHMENT TO CORN-PLANTERS.

939,983.

Specification of Letters Patent. Patented Nov. 16, 1909.

Application filed July 26, 1909. Serial No. 509,636.

*To all whom it may concern:*

Be it known that I, FAYETTE A. COOK, a citizen of the United States, residing at Elkader, in the county of Clayton and State of Iowa, have invented a new and useful Attachment to Corn-Planters, of which the following is a specification.

This invention has relation to planter attachment, and it consists in the novel construction and arrangement of its parts, as hereinafter shown and described.

The object of the invention is to provide an attachment especially adapted to be used in conjunction with a check-row corn-planter, for the purpose of depositing seed other than corn in the same hills in which the corn is planted. Frequently it is desired to plant other seed with the corn, as, for instance, pumpkin or beans, and it is with a view of providing a simple and effective attachment for a corn-planter whereby both seeds may be deposited at the same operation, that prompts the present invention.

With the above object in view the invention consists in providing the shoe of the planter with a seed inlet at a point between the seed-box mounted upon the shoe and the valve at the lower end thereof. The said seed inlet is connected by means of a flexible tube with an individual seed box having seed-dropping mechanism which is adapted to be operated by the same source of power that operates the seed-dropping mechanism in the seed box mounted upon the shoe. The individual seed-box referred to is adapted to contain the seed other than the corn, and therefore it will appear that when the corn is collected in the lower portion of the shoe and is retained therein by means of the valve usually employed in the shoe, that the other seed is also collected with the corn, and both kinds of seed are deposited simultaneously.

In the accompanying drawings:—Figure 1 is a perspective view of a corn planter equipped with the attachment. Fig. 2 is a perspective view of a portion of the attachment. Fig. 3 is a sectional view through the lower portion of the seed-box of the attachment. Fig. 4 is a sectional view through the lower portion of the shoe of the planter. Fig. 5 is a plan view of a ring used in the seed box of the attachment. Figs. 6 and 7 are plan views of disks adapted to be applied to the ring illustrated in Fig. 5.

The planter to which the attachment is applied comprises a seed-box 1, which is mounted upon a shoe or furrow-opener 2, having at its lower end a usual valve 3. The said box 1, shoe 2, and their attachments are connected with the frame of the planter in the usual manner, and operated by the traction wheels thereof. The shoe 3 is provided in its side with a seed inlet 4, which is connected by means of a flexible tube 5 with a seed outlet provided in the bottom of the individual seed box 6. The said seed box 6 is adapted to contain seed other than corn, which is to be planted with the corn. The seed-box 6 is of the usual pattern, and is mounted upon a bracket 7, which is attached to the frame of the planter. A gear ring 8 is mounted for rotation at the bottom of the seed-box 1, and is adapted to carry a disk 9, of which two forms are shown in Figs. 6 and 7 of the drawings. The disk shown in Fig. 6 is provided with two seed perforations 10, while the disk shown in Fig. 7 is provided with three.

A shaft 11 is journaled in bearings provided upon the frame of the planter, and a beveled gear-wheel 12 is fixed to the said shaft 11 and meshes with the ring 8. A sprocket wheel 13 is fixed to the shaft 11, and a sprocket wheel 14 is fixed to the axle 15 of the planter. The said axle 15 is adapted to derive rotary movement from the supporting wheels 16 of the planter in the usual manner. A spindle 17 is attached to the frame of the planter in advance of the shaft 11, and a pulley 18 is journaled upon the said spindle. A sprocket chain 19 passes around the pulley 18 and the sprocket wheel 14, and the sprocket wheel 13 bears against the upper run of the said sprocket chain 19. Thus it will be seen that as the planter moves in a forward direction and the axle 15 rotates, rotary movement is transmitted from the said axle to the sprocket chain 19, sprocket wheel 14 and pulley 18, to the sprocket wheels 13 and shaft 11. At the same time the dropping mechanism carried by the seed-box 1 is operated, and corn is permitted to fall in the lower portion of the shoe 2, and is held therein by the valve 3. Simultaneously seed is dropped from the individual seed-box 6 through the tube 5 into the lower portion of the shoe 2 above the valve 3. The mixed seed which is collected in the lower portion of the shoe 2 above the valve 3 is deposited in the ground when the said valve is held open by the mechanism provided upon the planter for operating the same.

Having described my invention, what I claim as new, and desire to secure, by Letters Patent, is:—

A planter attachment comprising a shoe, a seed-box mounted thereon, a valve located in the lower portion thereof, said shoe having in its side at a point between the seed-box and the valve a seed inlet, a flexible tube connected with said seed inlet, an individual seed-box having its outlet connected with said tube, a dropping mechanism located in the bottom of said individual seed-box, an operating shaft connected with the seed-dropping mechanism in the individual seed-box, bearings for said shaft, a sprocket wheel fixed to said shaft, a spindle for attachment to the frame of the planter at one side of the said shaft, an idle pulley journaled upon said spindle, and a chain adapted to be moved in an orbit about the axle of the planter and said idle pulley, the sprocket wheel upon the shaft having its periphery in contact with the upper run of the chain at a point between the axle and the idle pulley.

In testimony that I claim the foregoing as my own, I have hereto affixed my signature in the presence of two witnesses.

FAYETTE A. COOK.

Witnesses:
OTTO KLEINPELL,
J. P. DONLIN.